Patented July 10, 1951

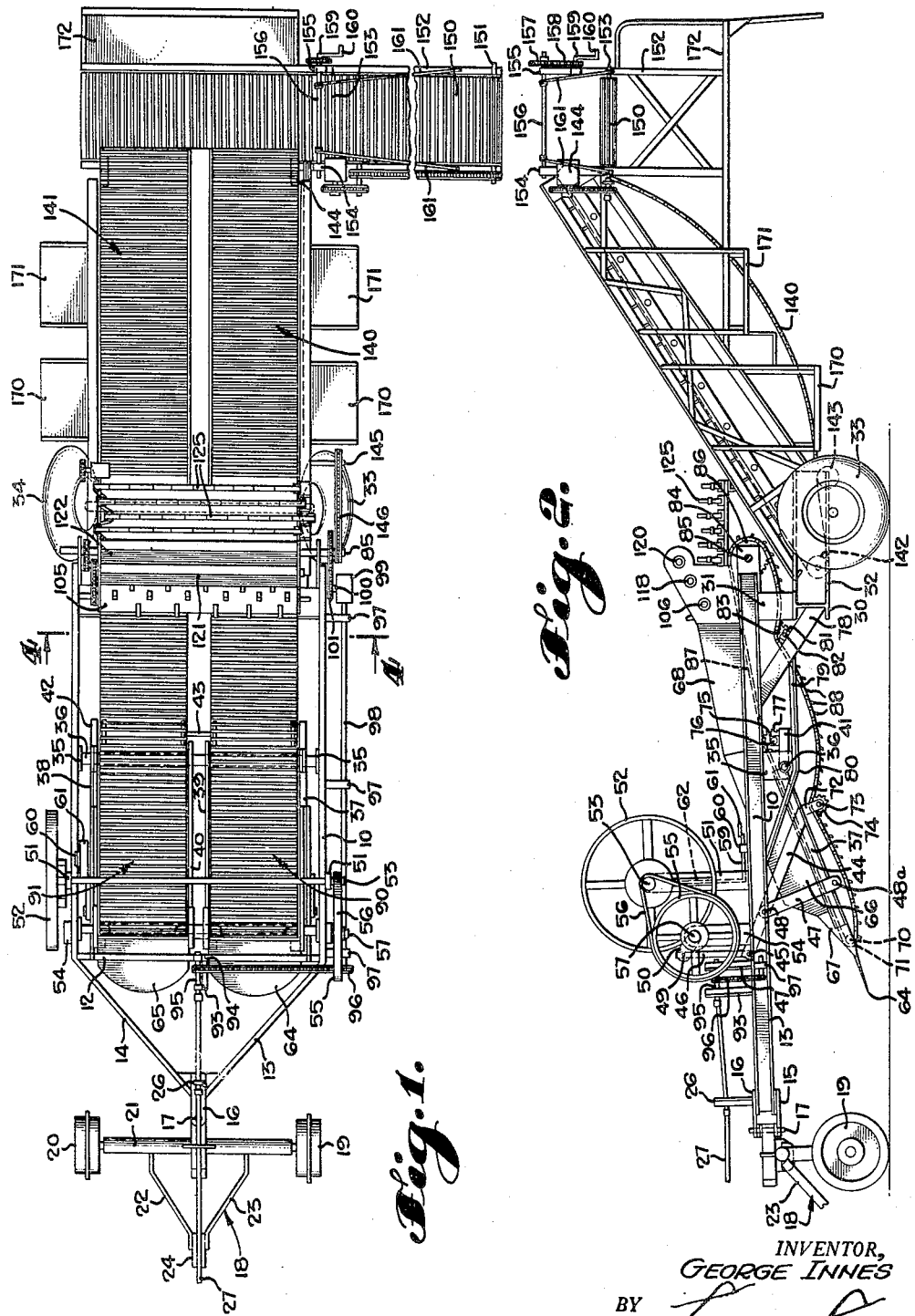

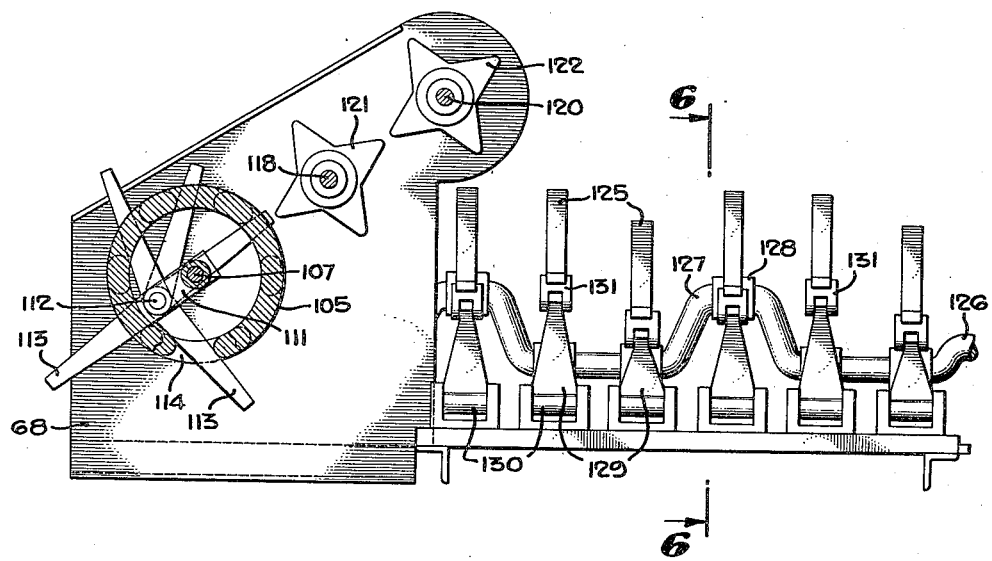

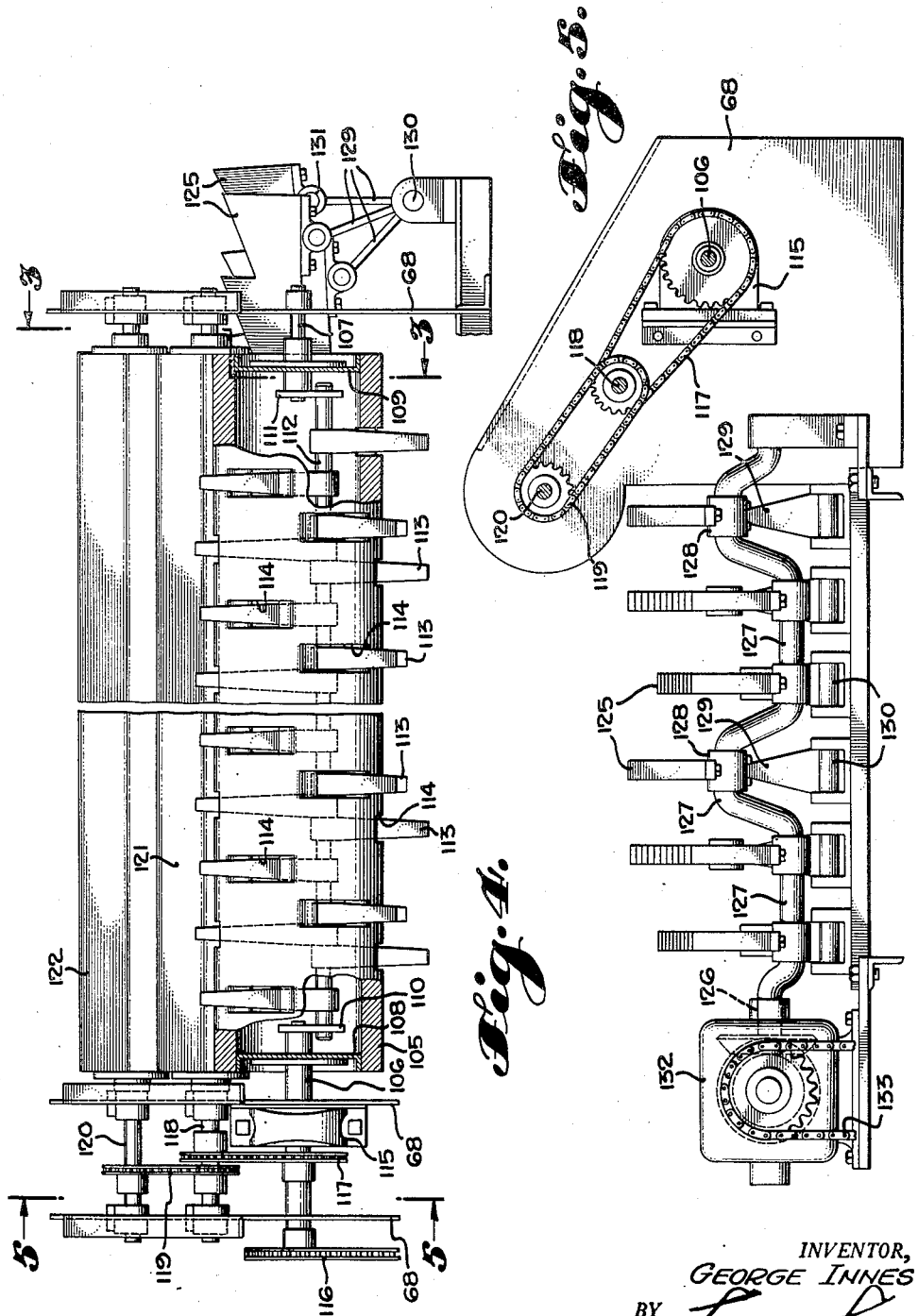

2,559,965

UNITED STATES PATENT OFFICE 2,559,965

TUBER DIGGER AND SEPARATOR

George Innes, Altadena, Calif.

Application November 3, 1948, Serial No. 58,105

7 Claims. (Cl. 55—9)

This invention relates to harvesting machinery and more particularly to harvesting machinery for tubers, such as potatoes and the like.

This invention contemplates a machine by which the tubers or potatoes are continuously dug from the earth, separated from their vines, and delivered into suitable receptacles, such as sacks or trucks, to be loaded.

Hitherto there has been experienced considerable difficulty in mechanically harvesting potatoes or other tubers due to the tendency of the tubers to adhere to the vines. Such prior efforts as have been made have generally related to attempts to separate the tubers from the vines by shaking the tubers from the vines.

This has required complicated and expensive machinery and has entailed considerable loss in harvesting due to the resistance of the tubers and vines to such separation.

It has also been proposed to strip the vines from potatoes by means of elements revolving adjacent the mixed vines and potatoes and having projections protruding therefrom. However, such expedients have been unsuccessful and impractical because of the tendency of the vines to tangle and twist around such revolving mechanism and eventually prevent its continuous operation.

It is accordingly one object of this invention to provide a mechanism for continuously harvesting potatoes and other tubers in which the tubers are continuously dug from the earth, separated from the vines, and delivered to a suitable receptacle.

It is a further object of this invention to provide in the machine of the type described efficient and continuously operating mechanism for stripping the vines from the potatoes.

It is a further object of this invention to provide a harvesting machine of the type described in which the injury to the potato, during harvesting and handling, is reduced to a minimum.

It is a feature of this invention that the potatoes undergoing harvesting, together with their attached or mixed vines, are presented to a revolvable mechanism wherein the vines are separated from the potatoes by rubber or other resilient plastic material fingers, which fingers subsequently release the vines and are retracted so as not to be able to become fouled with the vines.

It is a further feature of this invention that the vines, after undergoing a preliminary separation from the potatoes, are presented to a reciprocating mechanism which further separates any entrained potatoes.

These and other objects and advantages of the present invention will be apparent from the annexed specification in which:

Figure 1 is a plan view of a harvester embodying the present invention.

Figure 2 is a side view of the harvester.

Figure 3 is an enlarged fragmentary side section taken on the line 3—3 of Figure 4 and showing a portion of the vine-stripping and walker mechanism.

Figure 4 is an enlarged section taken on the line 4—4 of Figure 1, showing rotary drum and fingers employed in the present invention.

Figure 5 is a section taken along the line 5—5 of Figure 4.

Figure 6 is a section taken along the line 6—6 of Figure 3.

Referring now more particularly to the drawings and particularly to Figures 1 and 2, the harvester comprises a pair of laterally spaced frame members 10 and 11, a front cross bar 12, and a pair of converging bars 13 and 14.

The bars 13 and 14 are connected to spaced plates 15 and 16 which are bored to receive a pivot pin 17. Pivot pin 17 is adapted for removable connection with a front dolly 18 comprising a pair of spaced wheels 19 and 20, an axle 21, and a pair of arms 22 and 23 secured together as at 24, forming a yoke. An upstanding plate 26 is provided having a bearing therein to receive a power shaft 27.

The tongue just described is, of course, adapted to be secured to a suitable source of traction power, such as a tractor, and the shaft 27 is adapted to be secured to a power take-off on the tractor for purposes hereinafter described.

The frame of the harvester is provided with other suitable cross pieces, and adjacent the rear end thereof a T bar 30 is secured to a pair of depending brackets 31 attached to the under side of the beams 10 and 11. A pair of channels 32 is attached to the T bar 30 and carries in a suitable manner a pair of rear wheels 33 and 34. The wheels 33 and 34 are preferably disposed at a small included angle to the vertical, as indicated in Figure 1, so that they are provided with considerable camber. This is for the purpose of accommodating the space between the wheels to the conventional space between the rows of potatoes and yet affording the desirable width to the harvester.

A pair of brackets 35 is provided, one on the under side of each of the frame members 10 and 11 and a shaft 36 is journaled therein. Angle bars 37 and 38 are rigidly secured to the shaft 36 on either side of the harvester and plates 39 and 40 are rigidly secured to the shaft 36 adjacent the center of the harvester.

A pair of brackets 41 and 42 is provided, one rigidly connected to the angle 37 and the other rigidly connected to the angle 38, and a shaft 43 is journaled therein.

An arm 44 has its lower end affixed to the angle 37 and a similar arm extends upwardly from the angle 38. These arms are pivoted as at 45 to a link 46. A link 47 is pivoted as at 48 to the arms 44 and at their lower ends the links 47 are provided with rollers 48a engaging the underside of the arms 44. The link 46 is pivotally connected as at 49 to a short crank arm 50. A post 51 is provided on the frame on which is mounted a hand wheel 52. The hand wheel 52 has a hub 53, and a post 54 is also mounted upon the frame on which is mounted a wheel or pulley 55. A belt 56 extends around the pulley 55 and the hub 53, as clearly indicated in Figure 2. The arm 50 is rigidly secured to the hub 57 of the wheel 52. A lever 59 is pivoted as at 60 on the frame and has a foot treadle 61 on one end thereof. The other end thereof engages a shaft 62 adapted to carry a suitable pawl mechanism or the like for dogging the hand wheel 52.

Extending from the angle irons 37 or 38 to the plates 39 or 40 at the front end thereof is a pair of digging blades 64 and 65, and upwardly extending from the angle arms 37 and 38 are side frame members 66, 67, and 68. Similar side frame members are provided and formed integrally with the plates 39 and 40. Mounted between the plate members 67 on a shaft 70 journaled therein is a pair of sprocket wheels 71, and journaled in arms 72, which are affixed, respectively, to the angles 37 and 38 and plates 39 and 40, is a shaft 73. Each shaft 73 carries a pair of sprocket wheels 74. Journaled in an upstanding bearing 75, formed upon the bracket 41, is a shaft 76 on which is mounted a pair of sprocket wheels 77.

A strut 78 extends from the T bar 30 to the frame members 10 or 11 on either side of the harvester and an angle bar 79, bent upwards as at 80, extends from the strut 78 to the frame member 10 or 11 on either side. Journaled in a bearing 81, formed upon each strut 78, is a shaft 82, and the shaft 82 is provided with sprockets 83.

At the rear of each of the frame members 10 and 11 there is provided a bearing 84 in which is journaled a shaft 85 upon which is mounted the sprockets 86. An endless chain 87 is provided mounted upon the sprockets as indicated, and it will be appreciated that there is such a chain for each of the series of sprockets. Between the various chains there extend outstanding bars 88, thus forming an open framework conveyer belt. As will be apparent from Figure 1, there are two of such conveyer belts indicated generally as at 90 and 91.

A pair of posts 93 and 94 are provided on the framework, and a shaft 95 operably connected with the shaft 27 is journaled therein and carries a sprocket upon which is mounted a chain 96. A plurality of arms 97 extend outwardly from the frame member 10, as shown in Figure 1, and a shaft 98 is journaled therein carrying a sprocket also engaging the chain 96. The rear end of the shaft 98 is provided with a gear box 99 which transmits power to a stub shaft 100, upon which is mounted a sprocket engaging a chain 101, which chain 101 engages a sprocket keyed to the shaft 85, thus transmitting power to the shaft 85 and the sprockets 6, and driving the endless chain belts 90 and 91.

Mounted between the side frame members 68 is a vine-separating mechanism which is most clearly shown in Figures 3 and 4. This vine-separating mechanism comprises a drum 105 mounted on shafts 106 and 107 journaled in the side plates 68. The shafts 106 and 107 extend through the end walls 108 and 109 of the drum and carry on their inner ends crank arms 110 and 111. Between the two crank arms 110 and 111 is a shaft 112 journaled therein and the shaft 112 carries a plurality of fingers 113, formed of rubber or other resilient and plastic material. The drum 105 is provided with a corresponding plurality of openings 114 through which the rubber fingers 113 extend. The shaft 106 is provided with a bearing 115, and on its extreme end there is mounted a sprocket engaging a chain 116, which chain 116 is connected with the sprocket (not shown) mounted upon the shaft 85, thus providing power to the drum 105. A chain 117 is also mounted on a sprocket on the shaft 106 and engages a sprocket mounted upon the shaft 118. The shaft 118 carries another sprocket which in turn engages a chain 119, which chain 119 also engages a sprocket mounted upon the shaft 120. The shaft 118 is mounted between the plates 68 as shown, and has keyed thereto a star wheel 121. Similarly, the shaft 120 is thus mounted and has keyed thereto a star wheel 122.

As indicated in Figure 3, the star wheel 121 is spaced slightly above and beyond the drum 105, and similarly the star wheel 122 is spaced slightly above and beyond the star wheel 121.

In operation, as the harvester is drawn through a potato bed by means of the tractor and power applied by means of the shaft 27, the blades 64 and 65 will uproot the potatoes, vines and clods, and transfer the same to the endless belts 90 and 91. The endless belts 90 and 91, being of the open framework type, permit loose soil to drop therethrough. But the accumulated vines, clods, rocks and potatoes will be passed by the endless belts 90 and 91 to the region of the drum 105. The drum 105 is revolved by means of the shaft 106, a crank arm 110 and fingers 113, and as it revolves, the fingers are continuously extended through the openings 114 when the fingers are in the lower portion of their travel and withdrawn into the interior of the drum when they are in the upper portion of their travel, due to the fact that the pivot point of the fingers is eccentric to the axis of the drum 105. Thus the fingers will engage the vines and cause the same to be transferred upwardly, dropping the potatoes therefrom back on to the endless chains 90 and 91. From the drum 105 and fingers 113 the vines will be transferred to the star wheel 121 and thence to the star wheel 122. From the star wheel 122 the vines will be dropped on to the walkers. As shown most clearly in Figure 3, the walkers are disposed transversely of the harvester in a section below the star wheel 122, and comprise a plurality of notched plates 125 having their upper peripheries staggered as shown in Figure 6. The plates 125 are carried by an axle 126, from which crank arms 127 extend at varying angles to engage bearings 128 upon which the plates 125 are mounted. The other end of the plates 125 is carried by crank arms 129, which crank arms 129 are similarly disposed at angles to each other, and extend from shafts 130 to bearings 131 mounted upon the various plates 125. The shaft 126 is driven as by the gear box 132 which is in turn driven by the chain 133 from a suitable source of power.

Vines spilling from the star wheel 122 will drop senting harvested tubers and vines to a conveyor the improvement comprising: a vine stripper associated with said conveyor and including a rotatable drum, apertures in said drum, resilient fingers disposed within said drum and mounted eccentrically thereof for alternate retraction into and extension out of said apertures on rotation of said drum; a vine slinger adapted to receive vines from said stripper and having the shape of a star wheel; a walker disposed transversely of said frame and comprising spaced serrated plates mounted for rocking movement; said walker being disposed to receive vines from said vine slinger and shake any tubers remaining thereon loose from said vines and through said spaced plates; a conveyor having a portion disposed beneath said walker adapted to receive tubers falling between said spaced plates; and a second conveyor mounted transversely of said frame adapted to receive tubers from said last mentioned conveyor, said second conveyor having a portion mounted for vertical adjustment of its discharge end.

5. In a tuber harvester of the type employing a digging blade mounted on a frame and presenting harvested tubers and vines to a conveyor the improvement comprising: a vine stripper associated with said conveyor and including a rotatable drum, apertures in said drum, resilient fingers disposed within said drum and mounted eccentrically thereof for alternate retraction into and extension out of said apertures on rotation of said drum; a vine slinger adapted to receive vines from said stripper and including a pair of spaced star wheels; a walker disposed transversely of said frame and comprising spaced serrated plates mounted for rocking movement; said walker being disposed to receive vines from said vine slinger and shake any tubers remaining thereon loose from said vines and through said spaced plates; and a conveyor having a portion disposed beneath said walker adapted to receive tubers falling between said spaced plates.

6. In a tuber harvester of the type employing a digging blade mounted on a frame and presenting harvested tubers and vines to a conveyor the improvement comprising: a vine stripper associated with said conveyor and including a rotatable drum, apertures in said drum, resilient fingers disposed within said drum and mounted eccentrically thereof for alternate retraction into and extension out of said apertures on rotation of said drum; a vine slinger adapted to receive vines from said stripper and including a pair of spaced star wheels; a walker disposed transversely of said frame and comprising spaced serrated plates mounted for rocking movement; said walker being disposed to receive vines from said vine slinger and shake any tubers remaining thereon loose from said vines and through said spaced plates; a conveyor having a portion disposed beneath said walker adapted to receive tubers falling between said spaced plates; and a second conveyor mounted transversely of said frame adapted to receive tubers from said last mentioned conveyor.

7. In a tuber harvester of the type employing a digging blade mounted on a frame and presenting harvested tubers and vines to a conveyor the improvement comprising: a vine stripper associated with said conveyor and including a rotatable drum, apertures in said drum, resilient fingers disposed within said drum and mounted eccentrically thereof for alternate retraction into and extension out of said apertures on rotation of said drum; a vine slinger adapted to receive vines from said stripper and including a pair of spaced star wheels; a walker disposed transversely of said frame and comprising spaced serrated plates mounted for rocking movement; said walker being disposed to receive vines from said vine slinger and shake any tubers remaining thereon loose from said vines and through said spaced plates; a conveyor having a portion disposed beneath said walker adapted to receive tubers falling between said spaced plates; and a second conveyor mounted transversely of said frame adapted to receive tubers from said last mentioned conveyor, said second conveyor having a portion mounted for vertical adjustment of its discharge end.

GEORGE INNES.

REFERENCES CITED

The following references are of record in the file of this patent:

UNITED STATES PATENTS

| Number | Name | Date |
|---|---|---|
| 1,164,163 | Blair | Dec. 14, 1915 |
| 1,371,519 | Roosa | Mar. 15, 1921 |
| 1,789,527 | Larinan | Jan. 20, 1931 |
| 2,209,282 | Rodin | July 23, 1940 |
| 2,424,148 | Carelock | July 15, 1947 |

FOREIGN PATENTS

| Number | Country | Date |
|---|---|---|
| 483,304 | Germany | Sept. 30, 1929 |